United States Patent
Ygnace et al.

(10) Patent No.: US 10,254,385 B2
(45) Date of Patent: Apr. 9, 2019

(54) METHOD AND DEVICE FOR RADAR APPLICATIONS

(71) Applicant: Infineon Technologies AG, Neubiberg (DE)

(72) Inventors: Romain Ygnace, Brunnthal (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 346 days.

(21) Appl. No.: 15/052,099

(22) Filed: Feb. 24, 2016

(65) Prior Publication Data

US 2016/0170010 A1     Jun. 16, 2016

Related U.S. Application Data

(63) Continuation of application No. 13/770,260, filed on Feb. 19, 2013, now Pat. No. 9,279,883.

(51) Int. Cl.
| | | |
|---|---|---|
| G01S 7/02 | (2006.01) | |
| G01S 7/35 | (2006.01) | |
| G01S 13/02 | (2006.01) | |
| G01S 7/288 | (2006.01) | |
| G01S 13/93 | (2006.01) | |
| G01S 13/00 | (2006.01) | |

(52) U.S. Cl.
CPC ............ G01S 7/02 (2013.01); G01S 7/354 (2013.01); G01S 13/02 (2013.01); *G01S 13/931* (2013.01); *G01S 2007/2883* (2013.01); *G01S 2007/356* (2013.01)

(58) Field of Classification Search
CPC ....... G01S 2007/2883; G01S 2007/356; G01S 13/84
See application file for complete search history.

(56) References Cited

U.S. PATENT DOCUMENTS

| | | | |
|---|---|---|---|
| 3,588,460 A | 6/1971 | Smith | |
| 3,702,393 A | 11/1972 | Fuss | |
| 3,714,650 A * | 1/1973 | Fuller et al. | ............ G01S 13/84 |
| 3,746,848 A | 7/1973 | Clary | |
| 3,892,958 A | 7/1975 | Fuss | |
| 4,996,661 A | 2/1991 | Cox et al. | |
| 5,218,561 A | 6/1993 | Iwadare | |

(Continued)

FOREIGN PATENT DOCUMENTS

WO     01/94975 A1     12/2001

OTHER PUBLICATIONS

Notice of Allowance dated Nov. 6, 2015, U.S. Appl. No. 13/770,260.

(Continued)

*Primary Examiner* — Bernarr E Gregory
(74) *Attorney, Agent, or Firm* — Eschweiler & Potashnik, LLC

(57) ABSTRACT

A device for radar applications includes a computing engine, a radar acquisition unit connected to the computing engine, a timer unit connected to the computing engine, a cascade input port, and a cascade output port. The cascade input port is configured to convey an input signal to the computing engine and the cascade output port is configured to convey an output signal from the computing engine. Further, an according system, a radar system, a vehicle with such radar system and a method are provided.

21 Claims, 3 Drawing Sheets

(56) References Cited

U.S. PATENT DOCUMENTS

| | | |
|---|---|---|
| 5,483,475 A | 1/1996 | Kao |
| 5,613,039 A | 3/1997 | Wang et al. |
| 5,638,281 A | 6/1997 | Wang |
| 5,687,196 A | 11/1997 | Proctor, Jr. et al. |
| 5,781,144 A | 7/1998 | Hwa |
| 5,793,323 A | 8/1998 | Tsui |
| 6,003,056 A | 12/1999 | Auslander et al. |
| 6,208,946 B1 | 3/2001 | Arakawa et al. |
| 6,313,781 B1 | 11/2001 | Lee |
| 6,614,389 B2 | 9/2003 | Suzuki et al. |
| 6,650,274 B1 | 11/2003 | Krikorian et al. |
| 6,674,393 B2 | 1/2004 | Kishida |
| 6,674,397 B2 | 1/2004 | Hager et al. |
| 6,700,526 B2 | 3/2004 | Witten |
| 6,734,820 B2 | 5/2004 | Hager et al. |
| 6,753,805 B2 | 6/2004 | Nakanishi et al. |
| 6,909,397 B1 | 6/2005 | Greneker, III et al. |
| 6,950,056 B2 | 9/2005 | Hager et al. |
| 6,977,611 B1 | 12/2005 | Crabb |
| 7,071,868 B2 | 7/2006 | Woodington et al. |
| 7,082,172 B1 | 7/2006 | Pringle et al. |
| 7,095,361 B2 | 8/2006 | Mattes et al. |
| 7,151,484 B2 | 12/2006 | Shinonaga et al. |
| 7,312,742 B2 | 12/2007 | Steinway et al. |
| 7,327,303 B1 | 2/2008 | Halsey et al. |
| 7,352,320 B2 | 4/2008 | Enomoto et al. |
| 7,403,153 B2 | 7/2008 | Kelly, Jr. et al. |
| 7,423,578 B1 | 9/2008 | Tietjen |
| 7,466,261 B1 | 12/2008 | Hoctor et al. |
| 7,492,303 B1 | 2/2009 | Levitan et al. |
| 7,515,092 B2 | 4/2009 | Zumsteg |
| 7,518,545 B2 | 4/2009 | Minichshofer |
| RE40,854 E | 7/2009 | Iwadare |
| 7,737,879 B2 | 6/2010 | Tietjen et al. |
| 7,849,123 B2 | 12/2010 | Lai et al. |
| 8,239,442 B2 | 8/2012 | Lerner |
| 9,279,883 B2 * | 3/2016 | Ygnace et al. ......... G01S 13/02 |
| 2003/0210176 A1 | 11/2003 | Hager et al. |

OTHER PUBLICATIONS

Final Office Action dated Aug. 18, 2015, U.S. Appl. No. 13/770,260.

Non-Final Office Action dated Feb. 24, 2015, U.S. Appl. No. 13/770,260.

* cited by examiner

METHOD AND DEVICE FOR RADAR APPLICATIONS

REFERENCE TO RELATED APPLICATION

This application is a continuation of U.S. application Ser. No. 13/770,260 filed on Feb. 19, 2013, now U.S. Pat. No. 9,279,883, the contents of which are incorporated by reference in their entirety.

FIELD

Embodiments of the present disclosure relate to processing devices, in particular with regard to radar applications.

BACKGROUND

A fast Fourier transform (FFT) is an algorithm to compute the discrete Fourier transform (DFT) and its inverse.

Modern radars perform a significant part of signal processing digitally. A common digital signal processing technique is the Fast Fourier Transform (FFT). Within radar data paths, this algorithm is used in areas such as beam forming, pulse compression and Doppler processing.

With regard to automotive radar applications, FFT accelerators are getting increasingly popular in order to improve real-time processing and, e.g., adaptively controlling the cruise.

SUMMARY

A first embodiment relates to a device for radar applications comprising a computing engine, a radar acquisition unit connected to the computing engine, a timer unit connected to the computing engine, a cascade input port, and a cascade output port. The cascade input port is configured to convey an input signal to the computing engine and the cascade output port is configured to convey an output signal from the computing engine.

A second embodiment relates to a system for processing radar signals comprising a first device and a second device as suggested herein, wherein the cascade output port of the first device is connected to the cascade input port of the second device.

A third embodiment relates to a radar system comprising at least one device as suggested herein and at least one radio frequency unit connected to the radar acquisition unit of the device.

A forth embodiment is directed to a vehicle with a radar system as suggested herein.

A fifth embodiment relates to a method for processing a radar signal comprising converting a radio frequency signal into a digital signal by a radar acquisition unit of a first device. The method further comprises processing the digital signal by a computing engine of the first device, and providing the processed digital signal via a cascade output port of the first device to a cascade input port of a second device.

A sixth embodiment is directed to a device comprising computing means, radar acquisition means connected to the computing means, input means, and output means. The input means is configured to convey an input signal to the computing means and the output means is configured to convey an output signal from the computing means.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

The solution presented herein allows an efficient way to cascade devices and to organize processing of data in a cascading way, e.g., further processing FFT results instead of raw data. This allows utilizing the computing performance and memory (RAM) provided by a slave device in an efficient manner and to shift processing load from a master device.

Advantageously, in one embodiment the slave and the master device both have similar or identical structure, in particular comprise (at least partially) similar or identical components. This improves the flexibility as a generic device can be provided that—according to its implementation—can be used as master or slave or at different stages of a multi-stage processing chain of cascaded devices. Using substantially identical components in such cascaded application also reduces the costs as only one type of device needs to be provided.

Figure 1:
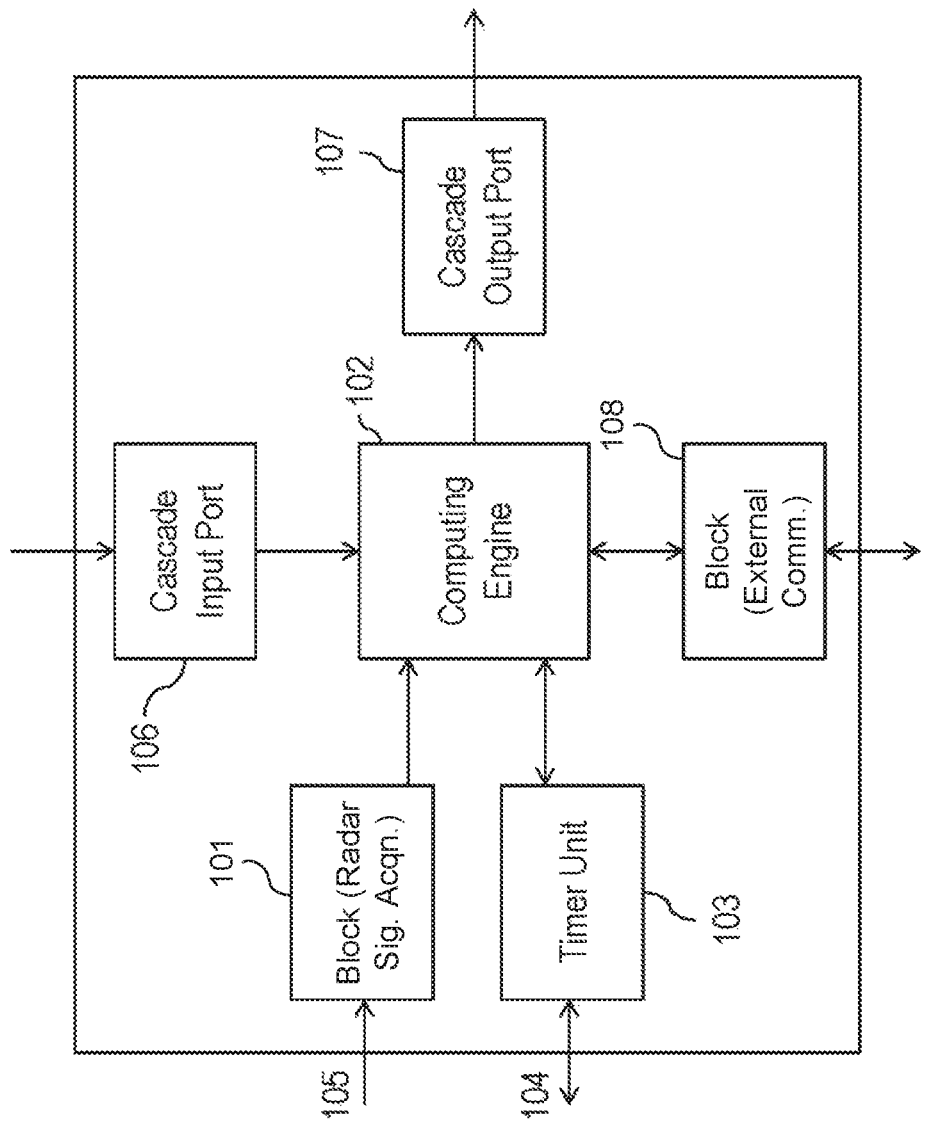
FIG. 1 shows a schematic architecture of a device that could be operated in a multi-stage of cascaded devices in radar signal processing environment.

FIG. 1 shows an example diagram of an architecture of a generic device that could be used in a multi-stage processing chain of cascaded devices.

A block 101 provides a radar signal acquisition functionality. For example, a radio-frequency (RF) 105 signal can be fed to this block 101, which is then forwarded to a computing engine 102. The computing engine 102 may be equipped with memory, e.g., read-only memory (ROM) and/or random access memory (RAM). The computing engine 102 may comprise one or more processors. As an option, the device can comprise several computing engines.

A timer unit 103 is connected to the computing engine 102 and to the block 101. In addition, the timer unit 103 can be synchronized with other devices via a pin 104.

The device further comprises a cascade input port 106 that is connected to the computing engine 102 and a cascade output port 107 that is driven by the computing engine 102. Signals or data can be fed to the computing engine 102 via the cascade input port 106 and signals or data can be sent from the computing engine 102 via the cascade output port 107.

The cascade output port 107 may provide a serialization functionality transforming parallel data from the computing engine 102 to serial data. In addition, the output port 107 may provide a cyclic redundancy check (CRC) information for error detection or any other code for error detection or error correction purposes. Furthermore, the cascade output port may add a time information, e.g., a time stamp.

For example, the computing engine 102 may obtain and process data from the block 101 and/or from the cascade input port 106. The cascade output port 107 can be optionally used to convey results determined by the computing engine 102 to an external device and/or for instrumentation purposes. Instrumentation may comprise tracing of internal processing results of the device shown in FIG. 1.

A block 108 for external communication is connected with the computing engine 102 for communicating with external components.

The block 108 may comprise a serial peripheral interface (SPI) for conveying management and/or configuration data. The block 108 may in particular supply a low bandwidth interface for such control purposes.

The device shown in FIG. 1 can be used in a single-chip mode.

As an alternative, several devices according to the one shown in FIG. 1 can be used in cascaded modes, i.e. as a master device and a slave device.

Figure 2:
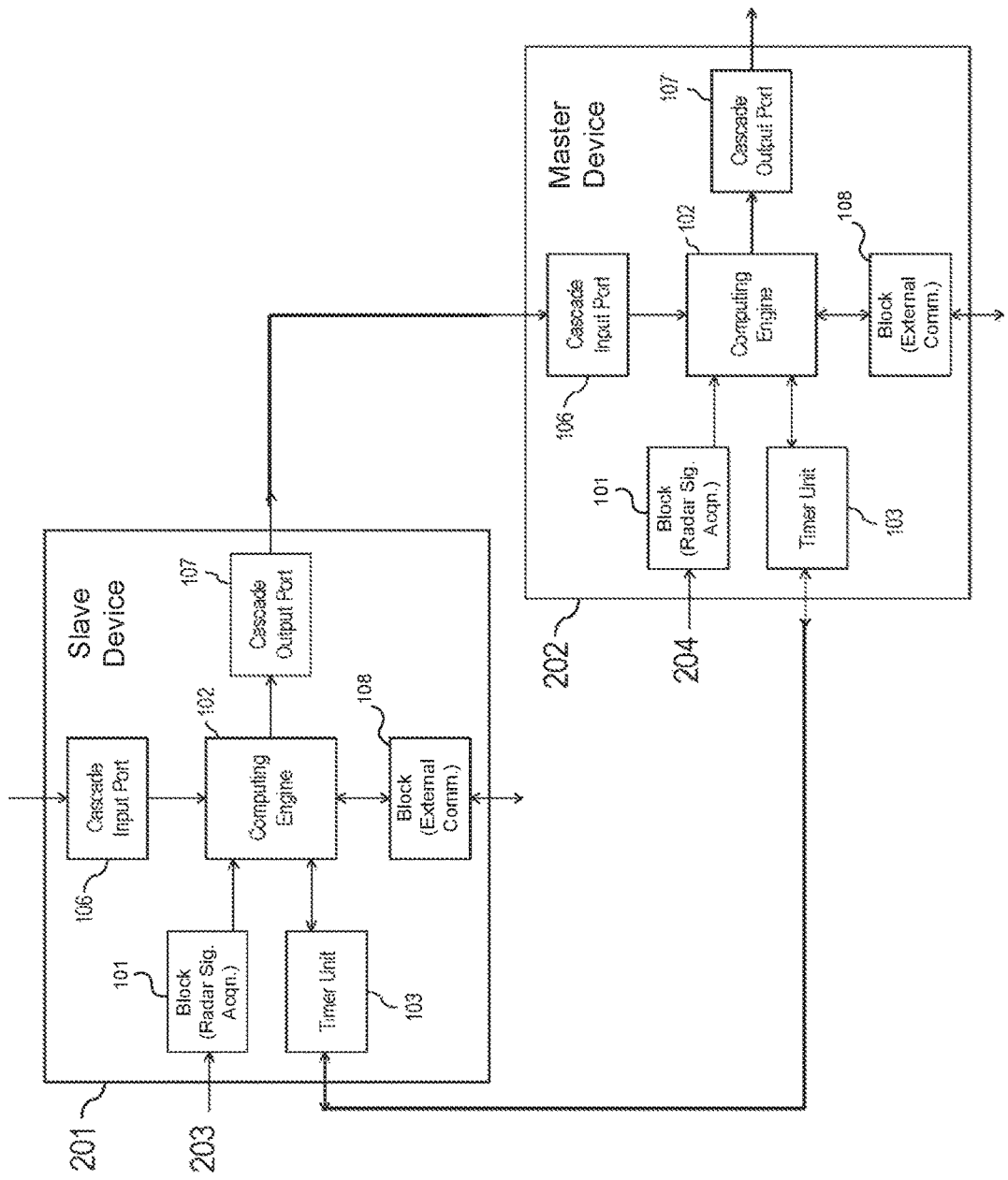
FIG. 2 shows a symbolic diagram comprising a cascaded structure of two of the devices shown in FIG. 1.

FIG. 2 shows a schematic block diagram comprising a slave device 201 and a master device 202, wherein each device has the architecture of the device shown in FIG. 1.

A radio frequency signal 203 is fed to the block 101 of the slave device 201 and a radio frequency signal 204 is fed to the block 101 of the master device 202. The timer units 103 of the slave device 201 and the master device 202 are connected; hence, their timers can be synchronized. In addition, the cascade output port 107 of the slave device 201 is connected to the cascade input port 106 of the master device 202. The block 108 of the master device 202 can optionally be connected to the slave device (e.g., for configuration purposes). The block 108 of the master device 202 can also be connected to a global output, e.g., a CAN bus (CAN: controller area network).

The configuration purposes may comprise: setting a computing engine's parameters for FFT operations, booting the computing engine 102 over SPI, configuration of the computing engine 102 (e.g., setting the computing engine 102 to master mode or slave mode), and setting up timers, for example.

It is noted that the unit providing the radio frequency signal (not shown in FIG. 2) could be realized as an integral part of the device. This applies for the radio frequency unit emitting a radar signal as well as detecting the reflected signal and pre-processing such signal, e.g., via at least one analog-to-digital converter.

As another option, the cascade output port 107 of the master device 202 can be used as instrumentation port, e.g., tracing internal data for monitoring purposes.

It is an option that the master device 202 and the slave device 201 are synchronized.

It is another option that the input data fed to the block 101 may be based on different data sources.

It is a further option that the cascade output port of the master device 202 is connected to the cascade input port of the slave device 201. This allows for the master device 202 to provide first and second stage processing.

For example, in a radar application, a distance to a target, a left angle, a right angle and/or a velocity can be determined. Each of these parameters can be used at one stage of processing and an FFT can be conducted at least once for each of the parameters in at least one stage. By cascading the devices, several processing stages can be provided by at least one of the cascaded devices.

Multi-stage processing can be provided based on raw data or signals (also referred to as RF signals from a radar receiver or a radar transceiver), wherein each stage does FFT processing and provides some results which are further processed in a subsequent stage or in a next timeslot.

The devices (e.g., master device 202 and/or slave device 201) may have the same memory structure and/or the same size of memory.

It is a next option that the device, in particular the master device 202 and/or the slave device 201 are bootable via a network, e.g., a network operated via the Internet protocol.

The solution presented herein can combine several devices in parallel and/or in series to provide distributed processing power, e.g., for FFT calculations, which can be combined by another device, which forwards the combined results to a control unit, e.g., a microcontroller or any processing device.

The device may also comprise a CAN bus interface for communicating with additional devices or control units over a bus structure, e.g., in a vehicle.

Figure 3:
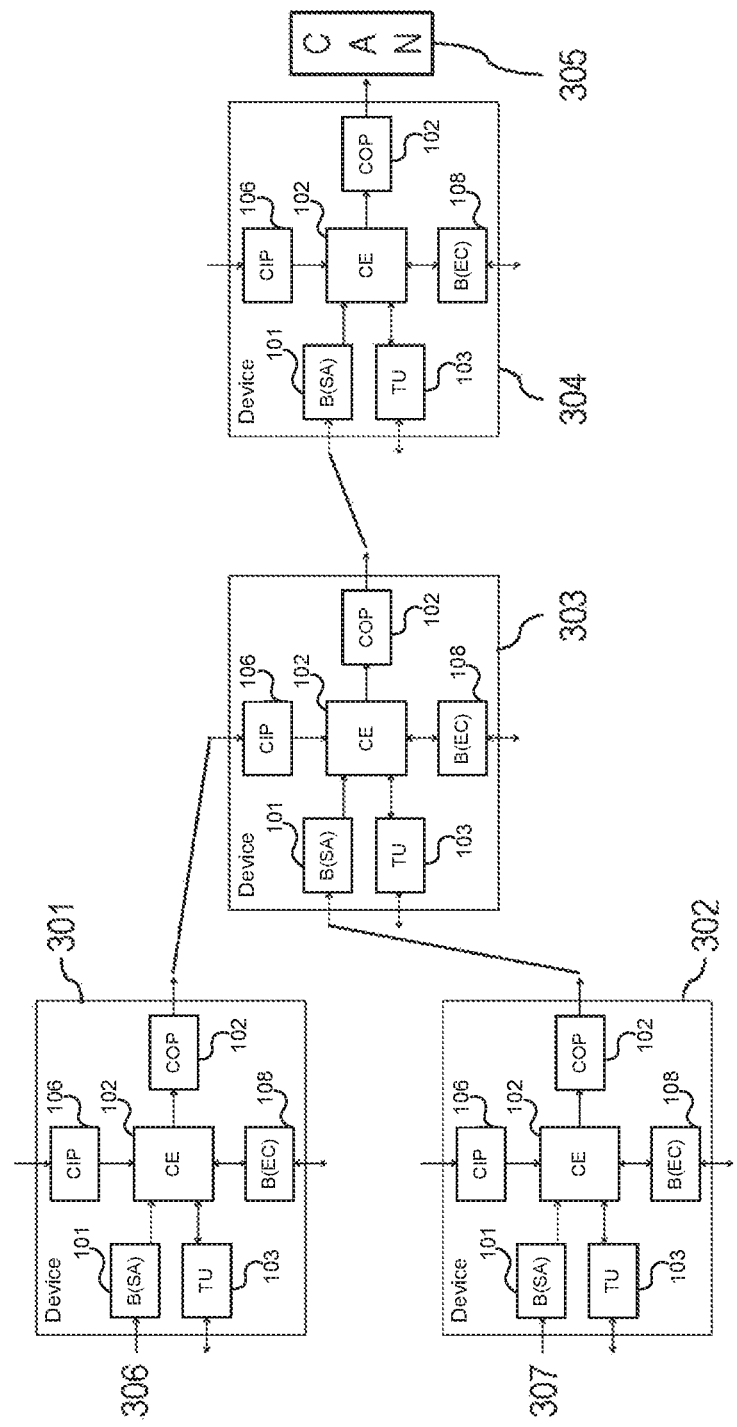
FIG. 3 shows an exemplary arrangement of several devices according to FIG. 1.

FIG. 3 shows an alternative block diagram comprising several devices 301 to 304, wherein each device has the architecture of the device shown in FIG. 1. As an option the device 304 could be realized as a common microcontroller or a control unit of, e.g., a vehicle.

An RF signal 306 is fed to the device 301 and an RF signal 307 is fed to the device 302. The RF signals are processed, e.g., converted from an analog into a digital signal, forwarded to and processed by the computing engine 102 of the respective device. The cascade output port 107 of the device 301 is connected to the cascade input port 106 of the device 303 and the cascade output port 107 of the device 302 is connected with the block 101 of the device 303. The cascade output port 107 of the device 303 is connected either to the cascade input port 106 of the device 304 or to the block 101 of the device 304. The cascade output port 107 of the device 304 is fed to a CAN interface 305, which is connected to a CAN bus. The CAN interface 305 could also be part of the device 304 (and/or any of the devices).

It is noted that other communication interfaces can be utilized accordingly, e.g., Internet, FlexRay or the like. It is further noted that the device 304 in FIG. 3 is optional and could be omitted.

The example structure of FIG. 3 bears the advantage, that a single type of device could be used at various stages of a processing chain. Also, at each stage the computing power as well as the memory of the device can be utilized to provide a distributed overall processing capability. This is in particular beneficial in scenarios where several input signals are advantageously pre-processed in order to combine the processed signals at a subsequent stage. A lot of computational power can be spent at an early pre-processing stage, i.e., at a device 301, 302 to obtain parameters (e.g., FFT data), which can be efficiently combined at a next stage 303.

In an example embodiment, the device could be operated in a slave mode obtaining data in a time domain and outputting data in a frequency domain. In an alternative embodiment, the device could be operated in a master mode obtaining data in a time domain or frequency domain and outputting data as transversal FFT data or in a frequency domain. In a further scenario, the device could be operated in a single-chip mode obtaining data in a time domain and outputting data as transversal FFT data or in a frequency domain. It is noted that the data can be obtained via the cascade input port or via the block 101 of the device and the data can be output via the cascade output port of the device.

A final output from the device operated in the master mode or the single-chip mode may be a potential target list. The target is, in one embodiment, an object that is identified by the radar system. Such target list can be further processed, e.g., by an evaluation unit of the car, which may influence the ride via acceleration, braking, active steering, etc.

Hence, the solution presented allows an efficient utilization of the computing performance provided by the slave device. In addition, master and slave device may have the same architecture.

In addition, a scalable radar architecture can be realized by using the same type of device several times in a cascaded way, e.g., as slave and master modes. By this approach, the benefits of the computing performance and the memory of the slave device are used so that the cascaded devices have a global performance and memory that is higher than the performance and memory of the master device alone.

Advantageously, the solution thus allows for the device to be used in multiple configurations in radar applications with the benefit that
- there is a reduced need for designing different devices;
- the devices have a higher overall performance when operated in cascaded mode (e.g., as master and slave devices);
- a single device can be operated in three different modes, i.e. master, slave or single-chip.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for radar applications, comprising:
a computing processor;
a radar acquisition hardware logic connected to the computing processor;
a timer hardware logic connected to the computing processor;
a cascade input port; and
a cascade output port,
wherein the cascade input port is configured to convey an input signal to the computing processor, and
wherein the cascade output port is configured to convey an output signal from the computing processor,
wherein the device is configurable as a master device or as a slave device.

2. The device according to claim 1, further comprising a communication hardware logic connected to the computing processor.

3. The device according to claim 2, wherein the communication hardware logic is configured to supply management data or configuration data to the computing processor.

4. The device according to claim 1, wherein the device is configurable as the master device by configuring the computing processor to a master mode and the device is configurable as the slave device by configuring the computing processor to a slave mode.

5. The device according to claim 4, wherein the device is configured in the slave mode to obtain data in a time domain and output data in a frequency domain.

6. The device according to claim 5, wherein the device conducts an FFT processing and provides FFT results that are processed at a subsequent device of the multi-stage processing.

7. The device according to of claim 4, wherein the device is configured in the master mode to obtain data in a time domain or frequency domain and output data as FFT data or in in a frequency domain.

8. The device according to claim 1, wherein the device is a single stage of a multi-stage processing.

9. The device according to claim 1, wherein the device is bootable via a network, in particular a network operated via the Internet protocol.

10. The device according to claim 1, wherein the output signal comprises a potential target list.

11. The device according to claim 1, wherein a timer hardware logic is configurable to be synchronized to a timer hardware logic of an external device.

12. The device according to claim 1, wherein a radio frequency signal from a radar radio frequency hardware logic is fed to the radar acquisition hardware logic.

13. The device according to claim 1, wherein the radar acquisition hardware logic comprises a radar radio frequency unit configured to receive a radar signal and provide a signal related thereto to the computing processor.

14. The device according to claim 1, wherein the radar acquisition hardware logic comprises a radio frequency signal processing means.

15. The device according to claim 1, wherein the radar acquisition hardware logic comprises an analog-to-digital converter.

16. The device according to claim 1, wherein FFT results are determined by the computing processor based on data from the radar acquisition hardware logic, and are forwarded via the cascade output port.

17. The device according to claim 1, wherein the cascade output port is configured to convey tracing or monitoring information.

18. The device according to claim 1, wherein the cascade output port is connected to a CAN bus interface.

19. The device according to claim 1, wherein the device is configured, in a single-chip mode, to obtain data in a time domain and output data as FFT data or in a frequency domain.

20. The device according to claim 1, wherein the device is a radar device that is in particular a single stage of a radar processing system.

21. A vehicle comprising at least one device for radar applications, said device comprising:
a computing processor;
a radar acquisition hardware logic connected to the computing processor;
a timer hardware logic connected to the computing processor;
a cascade input port; and
a cascade output port,
wherein the cascade input port is configured to convey an input signal to the computing processor, and
wherein the cascade output port is configured to convey an output signal from the computing processor,
wherein the device is configurable as a master device or as a slave device.

* * * * *